(12) United States Patent
Woo et al.

(10) Patent No.: US 10,751,884 B2
(45) Date of Patent: Aug. 25, 2020

(54) JOINT ACTUATOR, AND JOINT STRUCTURE OF LEG-SUPPORTING ROBOT COMPRISING SAME

(71) Applicant: ANGEL ROBOTICS Co., Ltd., Seoul (KR)

(72) Inventors: Han-Seung Woo, Goyang-si (KR); Byeong-Hun Na, Seoul (KR); Hyuck-Bae Kim, Siheung-si (KR)

(73) Assignee: ANGEL ROBOTICS Co., Ltd., Seoul (KR)

( * ) Notice: Subject to any disclaimer, the term of this patent is extended or adjusted under 35 U.S.C. 154(b) by 419 days.

(21) Appl. No.: 15/562,899

(22) PCT Filed: Apr. 7, 2016

(86) PCT No.: PCT/KR2016/003660
§ 371 (c)(1),
(2) Date: Sep. 29, 2017

(87) PCT Pub. No.: WO2016/163780
PCT Pub. Date: Oct. 13, 2016

(65) Prior Publication Data
US 2018/0079084 A1 Mar. 22, 2018

(30) Foreign Application Priority Data
Apr. 7, 2015 (KR) ........................ 10-2015-0048969

(51) Int. Cl.
*B25J 13/04* (2006.01)
*B25J 9/10* (2006.01)
(Continued)

(52) U.S. Cl.
CPC .............. *B25J 13/04* (2013.01); *A61H 1/024* (2013.01); *A61H 1/0244* (2013.01); *A61H 3/00* (2013.01);
(Continued)

(58) Field of Classification Search
CPC ..... B25J 9/06; B25J 9/0006; B25J 9/10; B25J 9/102; A61H 1/02; A61H 1/0237;
(Continued)

(56) References Cited

U.S. PATENT DOCUMENTS 6,966,882 B2 * 11/2005 Horst ................... A61H 1/0237
601/33
7,780,616 B2 * 8/2010 Katoh ................... A61F 5/0102
601/33

(Continued)

FOREIGN PATENT DOCUMENTS

JP 07-144007 A 6/1995
KR 10-0855811 B1 9/2008
(Continued)

OTHER PUBLICATIONS

International Search Report in International Application No. PCT/KR2016/003660, dated Aug. 9, 2016.
(Continued)

*Primary Examiner* — Rachel T Sippel
*Assistant Examiner* — Benjamin M. Kusiak
(74) *Attorney, Agent, or Firm* — Park, Kim & Suh, LLC

(57) ABSTRACT

A joint actuator includes a motor, a first gear part configured to change a direction of a rotational driving force applied by the motor and increase the applied rotational driving force, a spring member, a degree of a torsional deflection of Which is determined by a rotational. driving force supplied by the first gear part, and a second gear part configured to receive a rotational driving force according to the degree of the torsional deflection from the spring member. The first gear part includes a worm gear and a worm wheel gear configured to selectively engage with the worm gear. A joint structure
(Continued)

includes the joint actuator mounted on a housing thereof and a joint unit coupled to the housing to be rotatably driven by the joint actuator.

15 Claims, 11 Drawing Sheets

(51) Int. Cl.
| | |
|---|---|
| *B25J 17/02* | (2006.01) |
| *B25J 9/00* | (2006.01) |
| *A61H 1/02* | (2006.01) |
| *A61H 3/00* | (2006.01) |
| *B25J 9/08* | (2006.01) |
| *B25J 19/00* | (2006.01) |
| *F16H 3/20* | (2006.01) |

(52) U.S. Cl.
CPC ............... *B25J 9/0006* (2013.01); *B25J 9/08* (2013.01); *B25J 9/102* (2013.01); *B25J 17/0208* (2013.01); *A61H 1/0255* (2013.01); *A61H 2201/1215* (2013.01); *A61H 2201/1463* (2013.01); *A61H 2201/164* (2013.01); *A61H 2201/165* (2013.01); *A61H 2201/1671* (2013.01); *A61H 2201/50* (2013.01); *A61H 2201/5053* (2013.01); *A61H 2201/5058* (2013.01); *A61H 2203/0406* (2013.01); *A61H 2205/10* (2013.01); *B25J 19/00* (2013.01); *F16H 3/20* (2013.01)

(58) Field of Classification Search
CPC .... A61H 1/024; A61H 1/0244; A61H 1/0255; A61H 1/0262; A61H 2001/0211; A61H 2201/1207; A61H 2201/1215; A61H 2201/1463; A61H 2203/0406; A61H 3/00; A61H 2003/007; F16D 2011/006; F16D 11/16; F16H 3/34

USPC .......................................... 601/33; 74/606 R
See application file for complete search history.

(56) References Cited

U.S. PATENT DOCUMENTS

| | | | |
|---|---|---|---|
| 8,920,060 B2* | 12/2014 | Maekita | G05G 5/04 403/117 |
| 2006/0276728 A1* | 12/2006 | Ashihara | A61F 5/0102 601/5 |
| 2009/0173186 A1* | 7/2009 | Spurr | F16H 3/34 74/810.1 |
| 2014/0276261 A1* | 9/2014 | Caires | A61H 1/024 601/33 |
| 2016/0193102 A1* | 7/2016 | Roh | A61H 1/0244 623/27 |
| 2018/0325765 A1* | 11/2018 | Wilmington | A61H 1/024 |
| 2019/0262214 A1* | 8/2019 | Smith | A61H 3/00 |

FOREIGN PATENT DOCUMENTS

| | | |
|---|---|---|
| KR | 10-2009-0076824 A | 7/2009 |
| KR | 10-2012-0082219 A | 7/2012 |

OTHER PUBLICATIONS

Na, Byeong Hun et al., "Impedance Compensation of Lower Extremity Assistive Device with Compact Series Elastic Actuators", Korean Society of Mechanical Engineers, Spring and Autumn Conference, Nov. 2011, pp. 774-779. See pp. 774-777; and Figures 1-2.

* cited by examiner

FIG. 11A
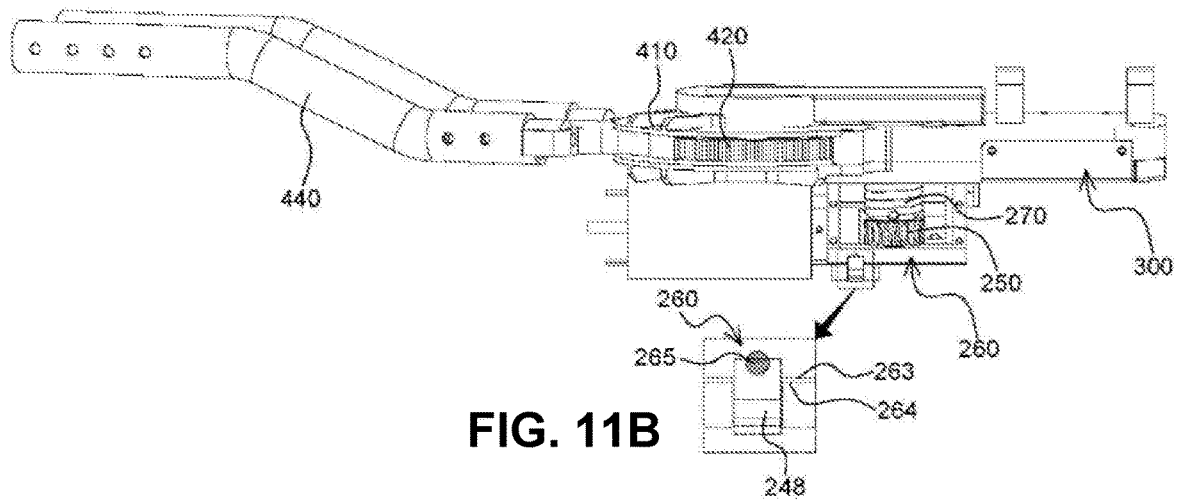
FIG. 11B
FIG. 11C
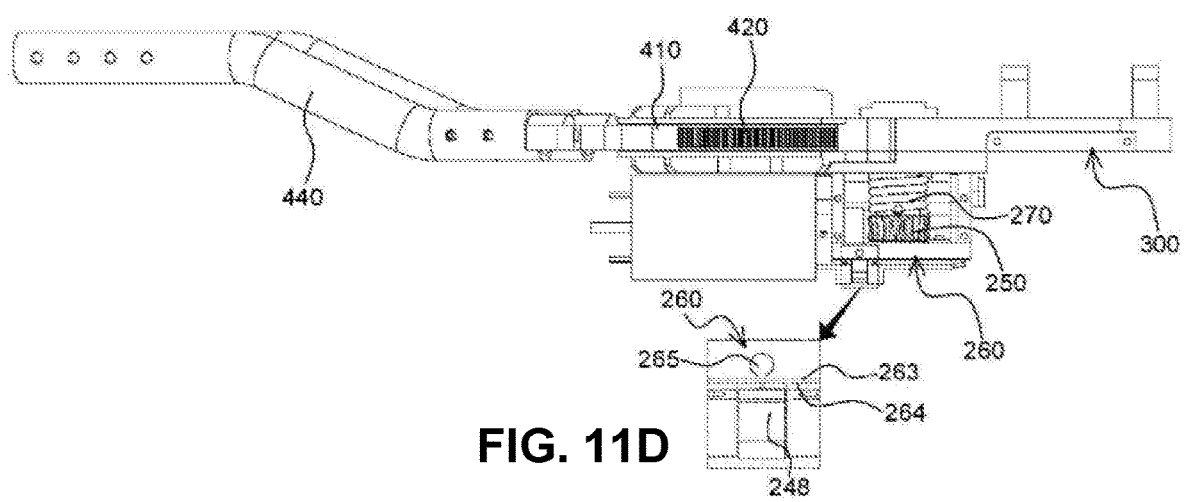
FIG. 11D

JOINT ACTUATOR, AND JOINT STRUCTURE OF LEG-SUPPORTING ROBOT COMPRISING SAME

CROSS-REFERENCE TO RELATED APPLICATIONS

This application is the National Stage filing under 35 U.S.C. 371 of International Application No. PCT/KR2016/003660, filed on Apr. 7, 2016, which claims the benefit of Korean Patent Application No. 10-2015-0048969, filed on Apr. 7, 2015, the contents of which are all hereby incorporated by reference herein in their entirety.

TECHNICAL FIELD

The present invention relates to a joint actuator and a joint structure of a leg-supporting robot including the same. More specifically, the present invention relates to a joint actuator which is capable of reducing or adjusting mechanical friction that a user may feel during use thereof and which is designed to be flexibly driven through selective engagement of gear parts, and a joint structure of a leg-supporting robot using the joint actuator.

BACKGROUND ART

Robots supporting body parts of elderly people growing due to an aging society and persons who acquired disability due to various accidents have been introduced.

Such devices supporting movement of those with impaired mobility have been continuously developed and commercialized. A leg-supporting robot supporting movement of a malfunctioning leg is a representative example of such devices.

The leg-supporting robot is a robot which provides joint torque to support weak legs of the disabled, the wounded, or the elderly when walking erect so that they may walk like normal people. Generally, an electric motor is used to provide the joint torque of the leg-supporting robot.

Since the leg-supporting robot is a robot designed to be worn by a user, an electric motor used therein should be manufactured to be small in size to reduce the weight and volume of the robot. Furthermore, a speed reducer is used in the electric motor to secure output torque.

However, when the speed reducer is used in the electric motor, the output torque of the electric motor increases according to a gear ratio but a degree of mechanical friction that a user may feel is not low due to a friction force generated when a plurality of gears are rotated while being engaged with each other.

Due to the mechanical force generated by the plurality of gears, the user would feel the sense of irritation and discomfort when the user wears the leg-supporting robot.

That is, during use of the leg-supporting robot, driving power for joints is provided by torque generated by the electric motor when walking erect but a user who wants to move a joint slightly or change his or her posture would feel, from the leg-supporting robot, a large degree of friction force interrupting the movement of the joint according to the user's intention when the driving power is not needed.

Accordingly, the mechanical friction of the leg-supporting robot should be reduced to actuate the leg-supporting robot according to a situation of a user who wears it and guarantee the user's flexible movement. However, although providing a sufficient degree of driving power for joints and reducing the mechanical friction to secure the user's flexible movement are contrary to each other in terms of purpose or function, there should be a trade-off between them.

DETAILED DESCRIPTION OF THE INVENTION

Technical Problem

The present invention is directed to a joint actuator which includes an elastic component and is thus capable of reducing or adjusting mechanical friction which may be generated at a joint part of a leg-supporting robot according to a situation or an external environment, and a joint structure of a leg-supporting robot including the joint actuator.

The present invention is also directed to a joint actuator in which gear parts may be selectively engaged with each other to improve a degree of freedom of movement of a joint part of a leg-supporting robot, and a joint structure of a leg-supporting robot including the joint actuator.

Technical Solution

According to an aspect of the present invention, there is provided a joint actuator comprising: a motor; a first gear part configured to change a direction of a rotational driving force applied by the motor and reduce speed of the rotational driving force so as to increase and apply the rotational driving force; a spring member, a degree of torsional deflection of which is determined by driving power supplied by the first gear part; and a second gear part configured to receive the rotational driving force according to the degree of torsional deflection of the spring member, and drive a target joint, wherein the first gear part comprises: a worm gear mounted on an axis of rotation of the motor; and a worm wheel gear configured to be engaged with the worm gear, the worm wheel gear having a drive shaft perpendicular to the axis of rotation of the motor, the joint actuator is mounted on a housing of a joint structure including the target joint, and the motor and the worm gear of the first gear part are hinge-coupled to the housing to be rotated about a part of the housing to which the motor and the worm gear are hinge-coupled, such that the motor and the worm gear are rotated toward the worm wheel gear of the first gear part to be engaged with the worm wheel gear or are rotated to be away from the worm wheel gear to be disengaged from the worm wheel gear.

And the second gear part may comprise at least one spur gear, wherein a drive shaft of the spur gear of the second gear part is aligned with that of the worm wheel gear of the first gear part, the spring member is torsionally deflected by the rotational driving force applied by the worm wheel gear of the first gear part, and the rotational driving force which is proportional to a degree of torsional deflection of the spring member is transferred to the spur gear of the second gear part.

And the worm gear and the worm wheel gear may be engaged with each other when they are rotated toward the worm wheel gear and are disengaged from each other when they are rotated to be away from the worm wheel gear.

And according to an aspect of the present invention, there is provided a joint structure of a leg-supporting robot, the joint structure comprising the joint actuator discussed above; and a joint unit configured to be hinge-coupled to the housing and rotatably driven by a rotational driving force applied by the second gear part, wherein the rotational driving force applied by the second gear part is transferred to the joint unit to rotatably drive the joint unit in a state in which the worm gear and the worm wheel gear of the first gear part are engaged with each other, and the transfer of the rotational driving force from the second gear part is blocked when the worm gear and the worm wheel gear of the first gear part are disengaged from each other.

And the joint unit may comprise a sprocket gear or hub, wherein the sprocket gear or hub is rotatably driven by driving power transferred to the spur gear of the second gear part.

And the sprocket gear or hub of the joint unit may be coupled to the spur gear of the second gear part via at least one auxiliary gear.

And the first gear part may comprises a worm gear cover configured to place the worm gear at an inner side thereof; and a worm wheel gear cover configured to place the worm wheel gear at an inner side, wherein the worm gear cover comprises a latch configured to be selectively coupled to the worm wheel gear cover so as to maintain engagement of the worm gear and the worm wheel gear, and the worm gear cover is elastically supported to maintain the engagement of the worm gear and the worm wheel gear.

And the worm wheel gear cover may comprise an anti-releasing part which is in the form of a plane inclined in a direction preventing an engaged state of the latch coupled to the worm wheel gear cover from being canceled.

And the worm wheel gear cover may comprise an engagement prevention part which is in the form of a protrusion preventing the latch disengaged from the worm wheel gear cover from being engaged with the worm wheel gear cover.

Advantageous Effects

In a joint actuator and a joint structure of a leg-supporting robot including the joint actuator according to the present invention, an elastic body is provided between a plurality of gears of the joint actuator to transfer driving power provided from a motor to a joint part via the elastic body. Thus, mechanical friction may be artificially controlled to be reduced or adjusted, when compared to an existing power transfer method using engagement of gears.

The joint actuator and the joint structure of the leg-supporting robot including the joint actuator according to the present invention are capable of being precisely driven according to any movement of a user who wears the leg-supporting robot or an external environment, thereby guaranteeing the user's flexible movement.

In the joint actuator and the joint structure of the leg-supporting robot including the joint actuator according to the present invention, different types of elastic bodies having different degrees of hardness are selectively used and thus the joint actuator providing different turn forces may be more flexibly applied according to a type of a device used or a user's state.

Furthermore, in the joint actuator and the joint structure of the leg-supporting robot including the joint actuator according to the present invention, the joint actuator designed to allow selective engagement of gear parts is used and thus a degree of freedom of movement of a user who wears the leg-supporting robot is more increased. Thus, the user may be able to more flexibly use the leg-supporting robot.

DESCRIPTION OF THE DRAWINGS

FIGS. 11A, 11B, 11C, and 11D illustrate an operation of a sensor switch according to an embodiment of the present invention.

MODE OF THE INVENTION

Figure 1A:
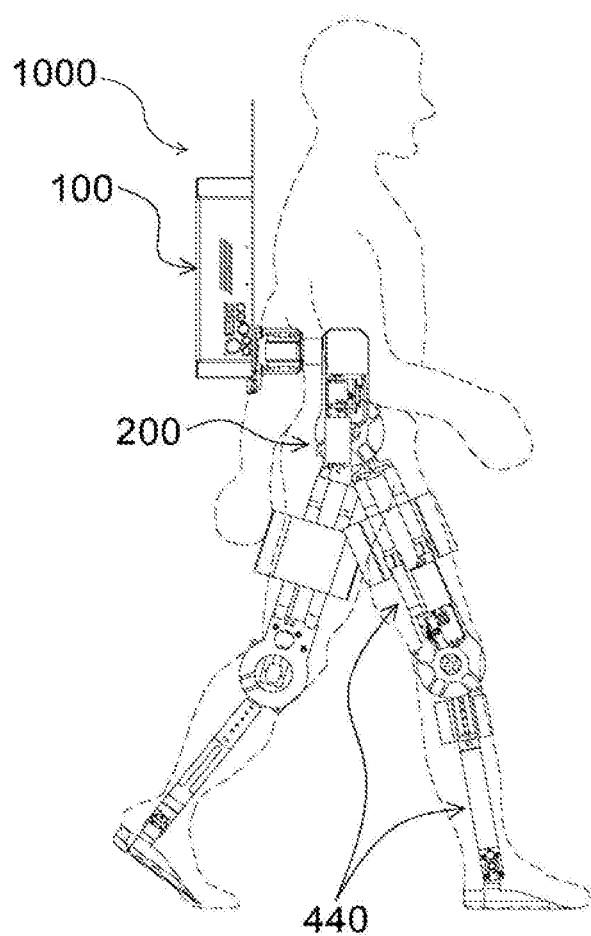
FIG. 1A and FIG. 1B illustrate an example of wearing a leg-supporting robot using a joint actuator.

Hereinafter, exemplary embodiments of the present invention will be described in detail. However, the present invention is limited to the embodiments set forth herein and may be embodied in many different forms. Rather, these embodiments are provided so that this disclosure will be thorough and complete and will fully convey the concept of the present invention to those of ordinary skill in the art. The same reference numerals represent the same elements throughout the drawings.

The present invention relates to a joint actuator, and a joint structure of a leg-supporting robot including the joint actuator. Before describing them in detail, the leg-supporting robot including the joint actuator will be described to help understanding of the present invention.

Figure 1B:
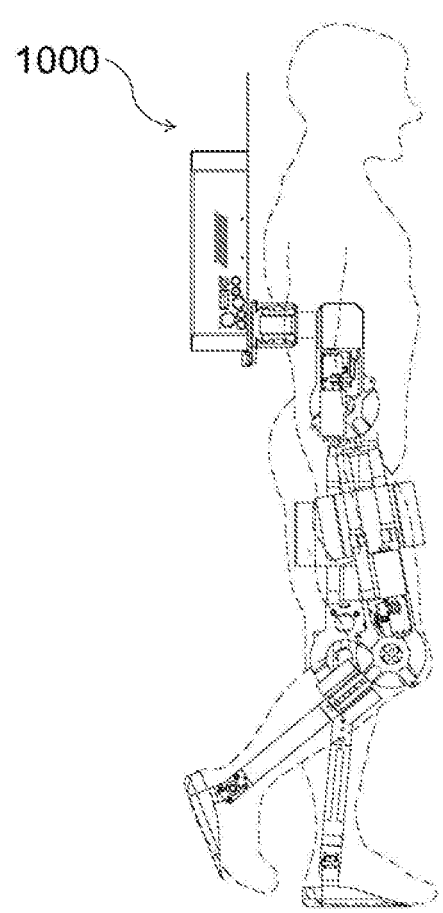

FIG. 1A and FIG. 1B illustrate an example of wearing a leg-supporting robot using a joint actuator.

A leg-supporting robot 1000 may include a joint actuator 200 attached to a hip joint or a knee joint among joints of a lower body of a user to provide a rotational driving force to the hip joint or the knee joint, and a driver 100 including a battery supplying power to the joint actuator 200 and a controller.

Although FIG. 1A and FIG. 1B illustrate an example in which the joint actuator 200 of the leg-supporting robot 1000 is provided on each of a hip joint and a knee joint, the joint actuator 200 may be provided on only one of the hip joint and the knee joint.

The joint actuator 200 is configured to provide rotational torque to joints when a user of the leg-supporting robot 1000 walks, and may receive power from the battery and drive a motor included in the joint actuator 200 or the like to provide the rotational torque.

Next, a skeletal frame 440 may be rotated by the rotational driving force provided from the joint actuator 200. The skeletal frame 440 may connect joints, rotate a device connected to a lower part thereof by the rotational torque, and support a user of the leg-supporting robot 1000 from the ground.

As described above, the leg-supporting robot 1000 may be designed to have a structure similar to a joint or skeleton structure of a lower body of a user.

However, the joint actuator 200 need not be provided at all joints of the lower body of the user. In some cases, the joint actuator 200 of the leg-supporting robot 1000 may be provided on only a part of the hip joint or a knee joint part as described above.

The leg-supporting robot 1000 is a device supporting movement of a lower body of a user and is thus used when a user of the leg-supporting robot 1000 wears the leg-supporting robot 1000. Thus, a mutual relation between the leg-supporting robot 1000 and the user is very important.

Thus, it is very important for the leg-supporting robot 1000 to provide a sufficient rotational driving force to a lower body of the user but a certain range of the user's flexible movement should be permitted The joint actuator 200 of the leg-supporting robot 1000 transfers a rotational driving force to the leg-supporting robot 1000. Generally, an electric motor may be used as a power source to transfer a sufficient rotational driving force. The joint actuator 200 using the electric motor may employ a speed reduction structure to reduce the size of the joint actuator 200 and achieve high output power. Thus, the joint actuator 200 employing the speed reduction structure may contribute to reducing the size of the leg-supporting robot 1000 and provide a high rotational driving force for its volume.

However, as described above, the joint actuator 200 employing the speed reduction structure transfers a rotational driving force through rotation of a plurality of gears engaged with each other. Thus, mechanical friction due to the plurality of gears rotated while being engaged with each other is a factor which interrupts a user's flexible movement.

Figure 2:
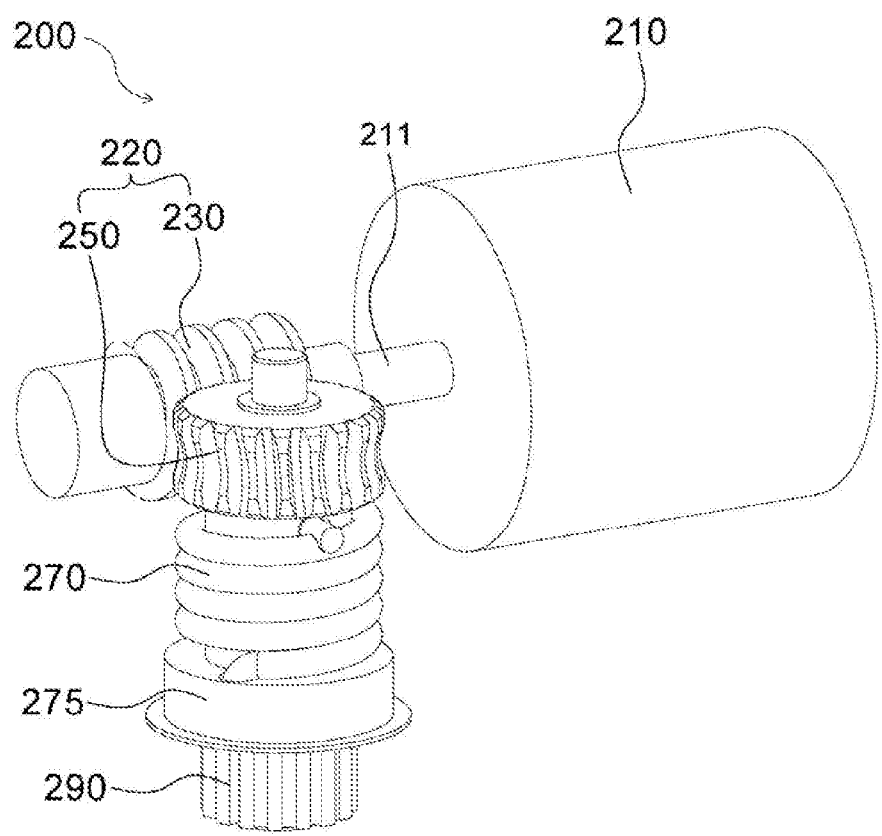
FIG. 2 schematically illustrates a joint actuator according to an embodiment of the present invention.

FIG. 2 schematically illustrates a joint actuator according to an embodiment of the present invention.

A joint actuator 200 according to an embodiment of the present invention may largely include a motor 210, a first gear part 220 configured to increase and apply a rotational driving force provided from the motor 210 by changing a direction of the rotational driving force and reducing a speed of the rotational driving force, a spring member 270, a degree of torsional deflection of which is determined by the rotational driving force applied by the first gear part 220, and a second gear part 290 configured to drive a target joint when the rotational driving force is transferred thereto according to the degree of torsional deflection of the spring member 270.

The joint actuator 200 according to the embodiment of FIG. 2 is configured to generate a rotational driving force by the motor 210 and transfer the rotational driving force.

The joint actuator 200 according to the present invention is applicable to any device requiring a rotational driving force, and may be applied as an actuator to a human-body-supporting robot to reduce friction force that a user may feel.

To solve the problem, the joint actuator 200 according to an embodiment of the present invention may employ a speed reducing structure to adjust a gear ratio, and maximize the rotational driving force.

Thus, the first gear part 220 may include a worm gear 230 mounted on a motor shaft 211 of the motor 210, and a worm wheel gear 250 engaged with the worm gear 230 and having a drive shaft perpendicular to an axis of rotation of the motor 210. The worm gear 230 and the worm wheel gear 250 may be rotated about the axis of rotation perpendicular thereto while being engaged with each other to increase the rotational driving force from the motor 210 while changing the direction of the rotational driving force.

As described above, when the speed reducing structure is employed in a joint actuator, a rotational driving force generated therewith may be increased. Thus, a sufficient rotational driving force may be obtained according to a design of the joint actuator. However, a high degree of friction force generated between gears due to the high rotation driving force generates a high degree of mechanical friction and thus a user may not be able to move.

That is, a friction force applied to a user's joints should be overcome according to the user's situation and a certain degree of movement or flexibility should be guaranteed. However, when a degree of mechanical friction is high, only the user's passive movements are permitted and any movement of the joints as necessary may not be permitted.

Thus, the joint actuator 200 according to an embodiment of the present invention may include the spring member 270 to reduce or adjust mechanical friction as described above.

The spring member 270 may be torsionally deflected by a rotational driving force provided from the worm wheel gear 250 of the first gear part 220, and a rotational driving force proportional to a degree of torsional deflection of the spring member 270 may be transferred to the second gear part 290.

In the transfer of the rotational driving force via the spring member 270, the rotational driving force is transferred through an elastic force according to the degree of torsional deflection of the spring member 270, unlike in an existing method of transferring a rotational driving force through rotation of gears engaged with each other. Thus, mechanical friction of a joint actuator may be removed or reduced by removing the degree of torsional deflection by a motor according to a user's situation.

Accordingly, in a leg-supporting robot employing a joint structure including a joint actuator according to the present invention, a motor is driven to remove a degree of torsional deflection of a spring member of the joint actuator according to a user's movement or posture. Thus, a method of driving the motor such that the user's movements are permitted within a certain range in situations in which the user does not walk, e.g., a situation in which the user is sitting may be used, as will be described in detail below.

The joint actuator 200 will be further described below. The second gear part 290 to which a rotational driving force is applied via the spring member 270 may include at least one spur gear 290. Here, a drive shaft of the spur gear 290 of the second gear part 290 may be aligned with that of the worm wheel gear 250 of the first gear part 220. Thus, the spur gear 290 may receive the rotational driving force from the spring member 270 and be then rotated about the same drive shaft in the same direction as the worm wheel gear 250.

The spur gear 290 according to an embodiment of the present invention is a gear configured to transfer a rotational driving force generated by the motor 210 to an output side. Referring to FIG. 2, one spur gear 290 is provided but a plurality of spur gears 290 may be provided to control a gear ratio according to the type of a device to which the joint actuator 200 is applied and a rotational driving force required for the device.

Next, the spur gear 290 rotated by receiving the rotational driving force from the spring member 270 may be directly coupled to a joint which is to be driven and is an output side or may be coupled to the joint via another spur gear so as to drive the joint.

The joint actuator 200 according to an embodiment of the present invention has been briefly described above.

A coupling relation and structure the joint actuator 200 will be described in detail below.

Figure 3:
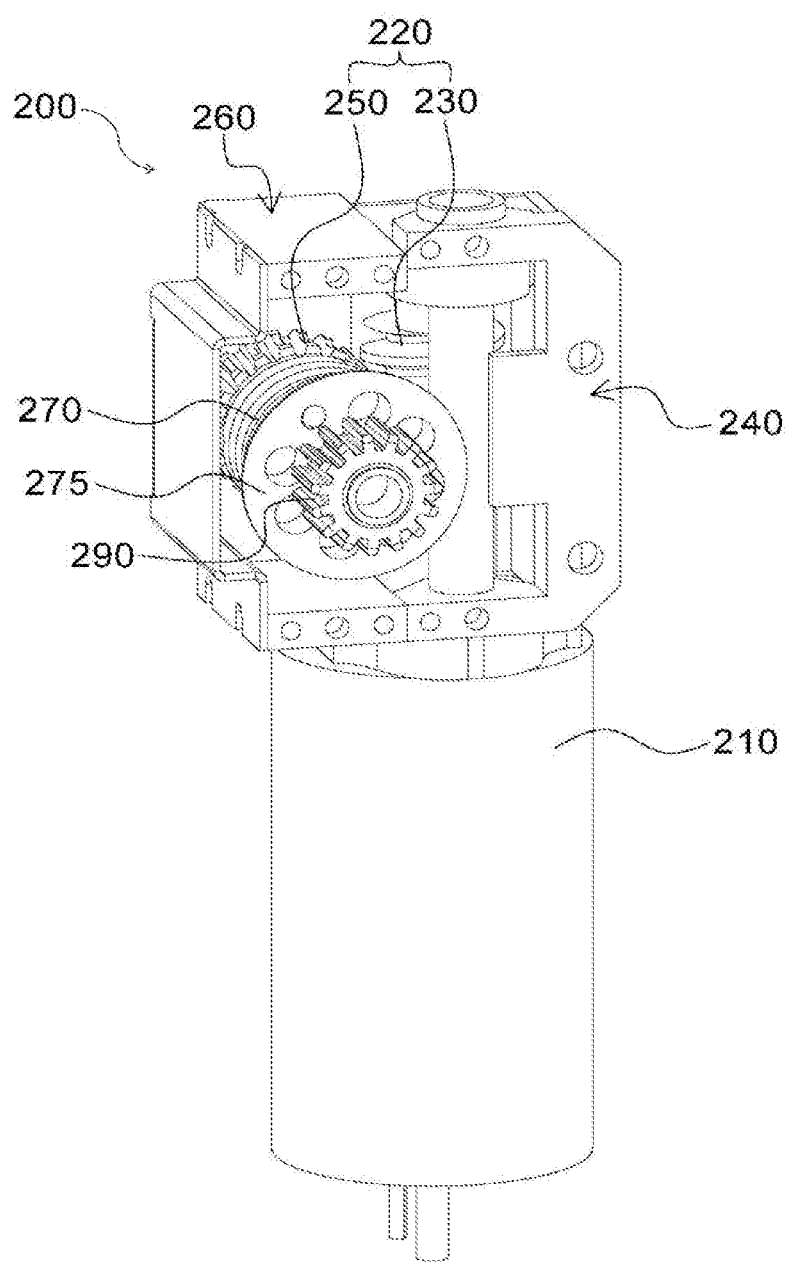
FIG. 3 is a perspective view of a joint actuator according to an embodiment of the present invention.
Figure 4:
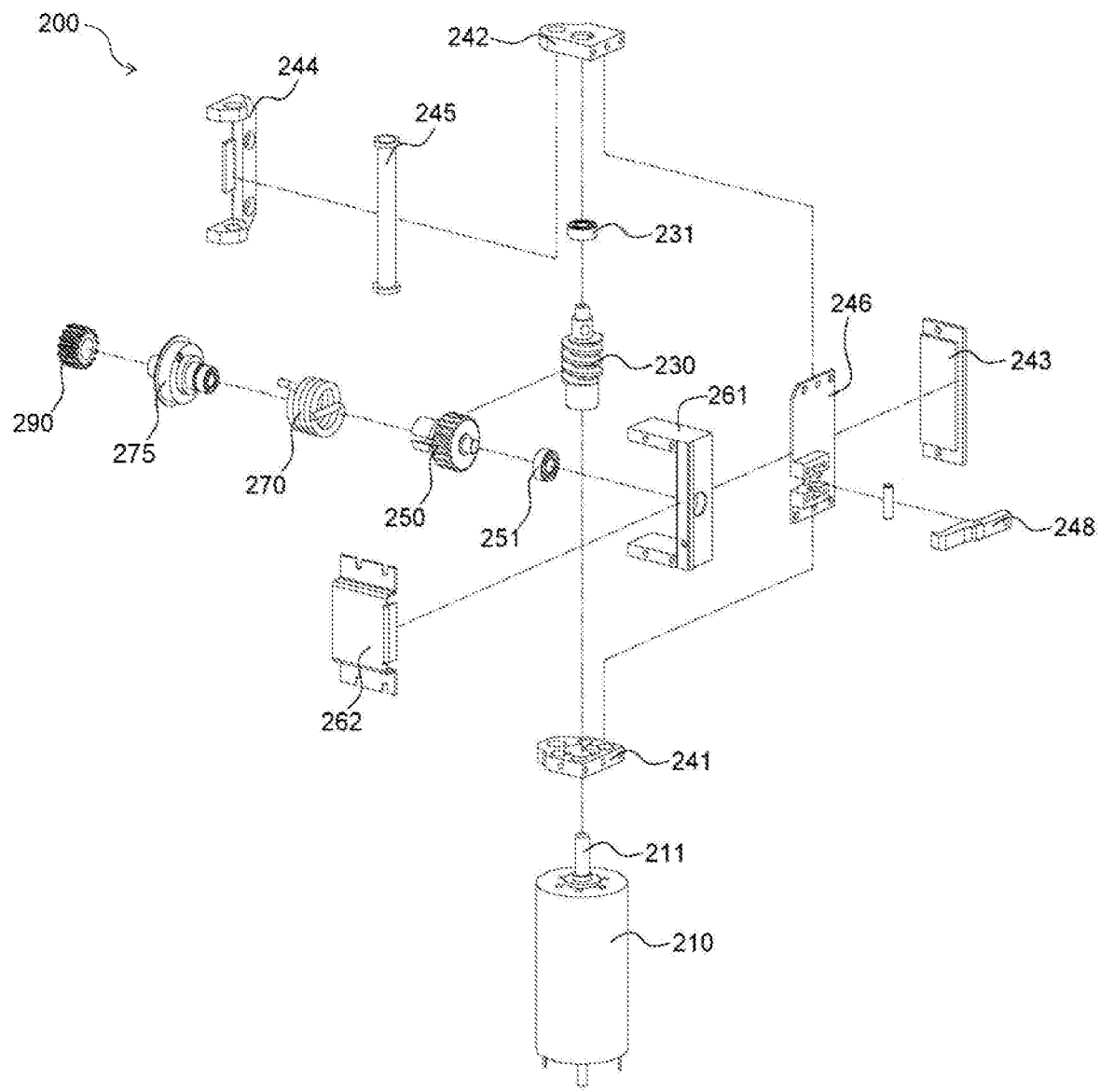
FIG. 4 is an exploded perspective view of a joint actuator according to an embodiment of the present invention.

FIG. 3 is a perspective view of a joint actuator according to an embodiment of the present invention. FIG. 4 is an exploded perspective view of a joint actuator according to an embodiment of the present invention.

Referring to FIGS. 3 and 4, in an embodiment of the present invention, the motor 210 includes the motor shaft 211 protruding from one end thereof. The motor shaft 211 may be rotated by a rotational driving force generated from the motor 210. The motor shaft 211 may be coupled to the worm gear 230 of the first gear part 220. The worm gear 230 may be rotated through rotation of the motor shaft 211 and receive the rotational driving force from the motor 210.

The worm gear 230 and the worm wheel gear 250 of the first gear part 220 may be mounted in covers each accommodating one of them.

The covers are configured to protect these gears and mount and stop a latch for a selective engagement structure, as will be described in detail below.

In detail, the worm gear 230 may be included in a worm gear cover 240. Components of the worm gear cover 240 and a coupling structure of the components will be described below.

A motor holder 241 which is a lowermost component of the worm gear cover 240 may be located below the worm gear 230 while being penetrated on the motor 210 by the motor shaft 211 of the motor 210. A pin holder 242 may be provided on the worm gear 230 to be penetrated by an end of the worm gear 230 coupled to the motor shaft 211 of the motor 210.

Here, the motor holder 241 and the pin holder 242 may be coupled to each other via a lateral member 246. Thus, the motor holder 241 provided on the motor 210 while being penetrated by the motor shaft 211 of the motor 210 and the pin holder 242 provided on the worm gear 230 while being penetrated by the end of the worm gear 230 are coupled to each other via the lateral member 246. Thus, the worm gear 230 may be provided while being supported by the motor holder 241 and the pin holder 242.

Thus, the worm gear 230 may be stably rotated by receiving a rotational driving force from the motor 210. Here, since the worm gear 230 is rotated while penetrating the pin holder 242, the worm gear 230 may be rotated in a state in which it penetrates the pin holder 242 while having a worm gear bearing 231 between the worm gear 230 and the pin holder 242.

A pin 245 may be fixed at the pin holder 242 while penetrating the pin holder 242 with respect to an axis parallel to the worm gear 230. The pin 245 may be also coupled to the motor holder 241 by being penetrated by the motor holder 241. That is, the pin 245 may be provided in parallel with the worm gear 230 to be coupled to the pin holder 242 and the motor holder 241 while passing through both the pin holder 242 and the motor holder 241. Here, the pin 245 may be hinge-coupled to a hinge bracket 244. Thus, the joint actuator 200 may be rotated on an object on which the joint actuator 200 is mounted through the pin 245 and the hinge bracket 244 which is hinge-coupled to the pin 245.

That is, the hinge bracket 244 which is hinge-coupled to the pin 245 is mounted and fixed on the object. Thus, the pin holder 242 coupled to the pin 245, the worm gear 230 coupled to the motor holder 245, and the motor 210 coupled to the motor holder 241 and located below the motor holder 241 may be rotated with respect to the hinge bracket 244, as will be described in detail below.

Similarly, the worm wheel gear 250 of the first gear part 220 may be coupled to the inside of a worm wheel gear cover 260 to be rotatable.

A worm wheel gear guide 261 to which the worm wheel gear 250 is coupled to be rotatable may be included at an inner side of the worm wheel gear cover 260. The worm wheel gear 250 may be coupled to the worm wheel gear guide 261 via a worm wheel gear bearing 251.

Here, the worm wheel gear guide 261 may be designed to communicate with the worm gear cover 240 such that the worm wheel gear 250 coupled to the worm wheel gear guide 261 may be engaged with the worm gear 230 included in the worm gear cover 240.

The worm wheel gear cover 260 may include a worm wheel protecting member 262 on a surface opposite to a surface thereof communicating with the worm gear cover 240 and may thus protect the worm wheel gear 250 from the outside.

Similar to the worm wheel protecting member 262 included in the worm wheel gear cover 260, the worm gear cover 240 may include a worm gear protecting member 243 on a surface opposite to a surface thereof communicating with the worm wheel gear cover 260 so as to protect the worm gear 230 from the outside.

The spring member 270 may be coupled to the worm wheel gear 250 of the first gear part 220. The spring member 270 may have a cylindrical shape. One end of the spring member 270 may be coupled to the worm wheel gear 250 such that the spring member 270 is aligned with the drive shaft of the worm wheel gear 250.

The spur gear 290 of the second gear part 290 may be coupled to another end of the spring member 270 having the one end coupled to the worm wheel gear 250.

Here, the spring member 270 may include a coupling shaft 275 to be inserted into an inner circumferential surface of the spring member 270 so that the spring member 270 may be stably located on the same drive shaft line as the worm wheel gear 250 and the spur gear 290.

The coupling shaft 275 is inserted into the inner circumferential surface of the spring member 270 coupled to the worm wheel gear 250. The spring member 270 may be coupled to the spur gear 290 via the coupling shaft 275. However, the coupling shaft 275 is not an indispensable component of the joint actuator 200 according to an embodiment of the present invention and may be thus omitted.

As described above, the joint actuator 200 according to an embodiment of the present invention has a structure, in which a rotational driving force generated by the motor 210 is transferred to the spring member 270 after the direction of the rotational driving force is changed and a speed thereof is reduced by a pair of first gear parts 220 having rotation axes perpendicular to each other, the spring member 270 is torsionally deflected by the transferred rotational driving force, and a restoring force of the torsionally deflected spring member 270 is transferred as a driving force to the second gear part 290 having at least one spur gear 290.

However, the plurality of gears of the joint actuator 200 are not limited to the configurations and structures described above, and may be configured in various other forms, provided that the plurality of gears are provided to transfer a rotational driving force therethrough and the spring member 270 is included between at least one among the plurality of gears to transfer the rotational driving force through torsional deflection of the spring member 270.

That is, only some of the plurality of gears 230, 250, and 290 of the joint actuator 270 may be provided or other gears may be further provided according to use of an object to which the joint actuator 200 is applied and a rotational driving force required. A coupling relation between gears may be designed according to a selective combination of structures coupled to each other with respect to a vertical drive shaft line and the same drive shaft. Other spring members 270 may be further provided according to the number of the plurality of gears of the joint actuator 200 to connect the plurality of gears to one another.

The spring member 270 may be torsionally deflected during the transfer of the rotational driving force from the motor 210. In this case, the joint actuator 200 may compensate for a degree of torsional deflection of the spring member 270 by measuring the degree of torsional deflection of the spring member 270 and controlling the motor 210 according to the degree of torsional deflection.

That is, the motor 210 may remove or adjust mechanical force that a user may feel by rotating the spring member 270 such that the degree of torsional deflection of the spring member 270 is compensated for to restore the spring member 270 to an original state thereof.

Here, the hardness of the spring member 270 may be considered before the spring member 270 is selected and included as a component of the joint actuator 200. When the hardness of the spring member 270 is high, the degree of torsional deflection of the spring member 270 is low and thus the rotational driving force provided by the motor 210 may be easily transferred to an output side but output of a rotational driving force cannot be flexibly controlled during the user of the joint actuator 200. When the hardness of the spring member 270 is low, a rotational driving force to be output from the joint actuator 200 may be low. Thus, a spring member having appropriate hardness may be selected and included as the spring member 270.

The spring member 270 is a most important component of the joint actuator 200 according to the present invention, and may provide an effect of reducing a friction force which may be generated due to engagement of gears, when employed in an existing joint actuator designed only using engagement of gears.

Furthermore, the spring member 270 may be flexibly driven to correspond to rotation which may occur at an output side of the joint actuator 200 according to external conditions, separately from rotation conducted through the motor 210 applying a rotation driving force to the joint actuator 200.

Specifically, the output side which is rotatable while being coupled to the second gear part 290 of the joint actuator 200 may be rotated through interaction with the ground, the wall, or an external object, separately from rotation conducted by a rotational driving force provided by the joint actuator 200.

In this case, the spring member 270 coupled to the second gear part 290 may be torsionally deflected by the rotation of the output side. Thus, the joint actuator 200 may rotate the motor 210 to restore the spring member 270 to the original state thereof to compensate for the torsional deflection of the spring member 270.

Thus, the joint actuator 200 may be driven to correspond to additional rotation of the output side while rotating the output side by applying a rotational driving force to the output side. Accordingly, the rotation of the output side may be more flexibly handled.

As described above, the joint actuator 200 employs the spring member 270 and thus a friction force corresponding to a rotational output which may be generated by the joint actuator 200 may be reduced. Thus, rotation which may occur at the output side through interaction with the outside may be flexibly handled.

However, the output side coupled to the joint actuator 200 may arbitrarily interact with the outside in some cases. That is, in the case of a device to which the joint actuator 200 is applied, e.g., the leg-supporting robot 1000 of each of FIGS. 1A and 1B, a user of the leg-supporting robot 1000 may walk by receiving a rotational driving force from the joint actuator 200, and movement of a joint of the user which is not related to the rotational driving force is needed in some cases.

For example, the user of the leg-supporting robot 1000 may lessen a pain occurring at the user's joint when walking or sit on a chair or the ground.

In this case, the joint actuator 200 may compensate for torsional deflection of the spring member 270 according to the user's intention and thus the user may walk as he or she wants. However, the motor 210 applying a rotational driving force to the joint actuator 200 should be operated even in this case. Thus, the motor 210 should be always operated. When a rechargeable battery is used, power cannot be efficiently used.

Accordingly, a joint actuator capable of more flexibly handling an interaction with the outside through selective disengagement of gears if necessary may be needed.

Figure 5A:
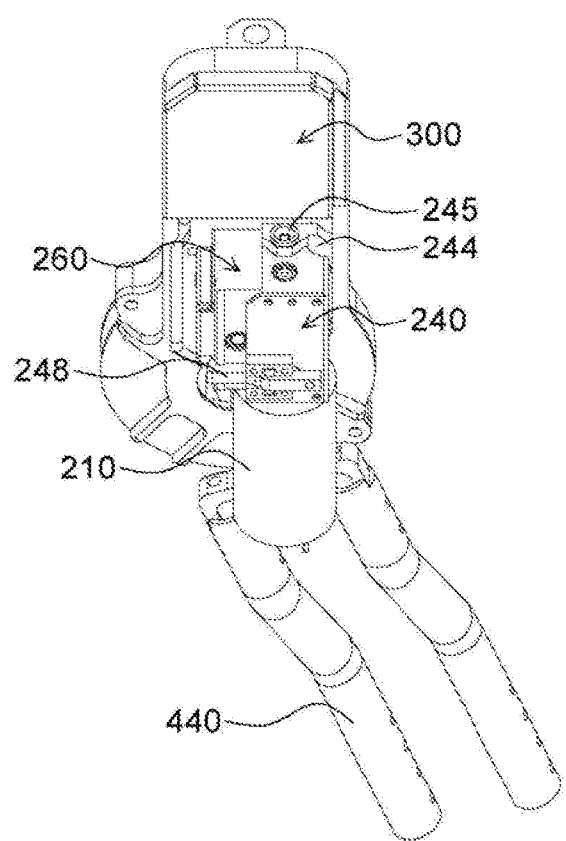
FIG. 5A and FIG. 5B illustrate a joint structure to which a joint actuator is applied, according to an embodiment of the present invention.
Figure 5B:
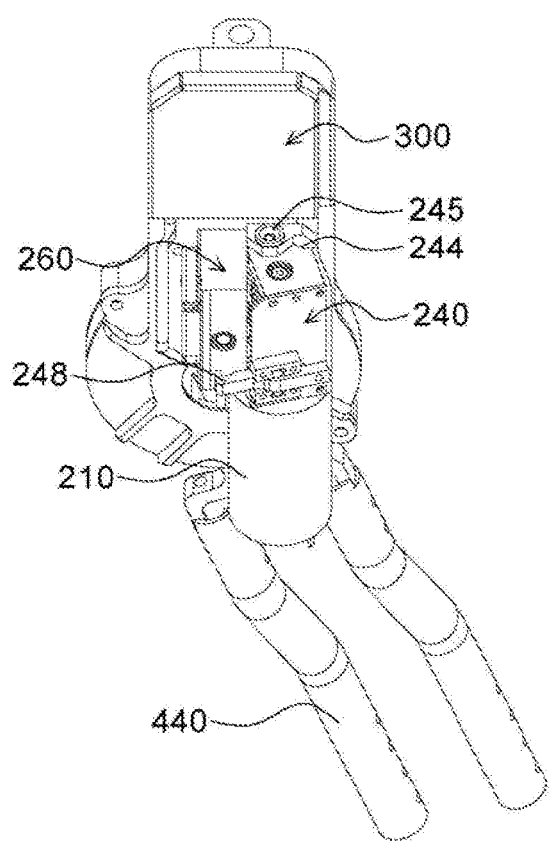
Figure 6A:
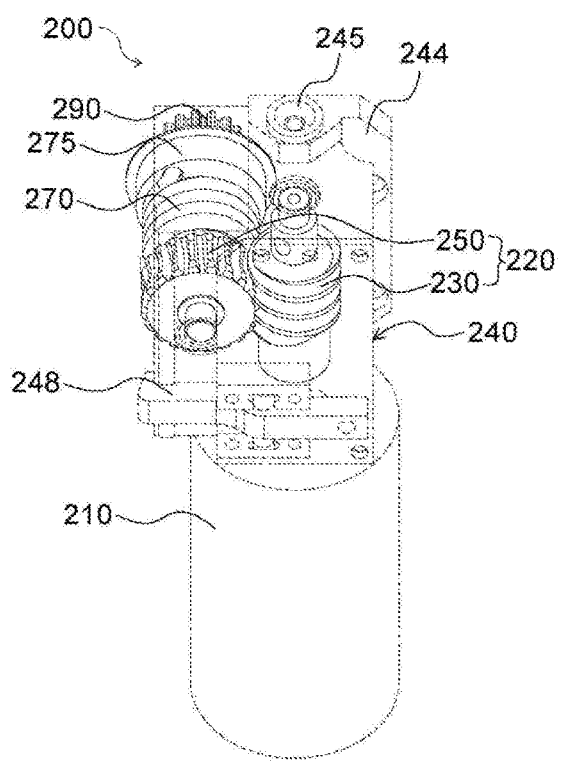
FIG. 6A and FIG. 6B illustrate engagement and disengagement of a first gear part of a joint actuator, respectively, according to an embodiment of the present invention.
Figure 6B:
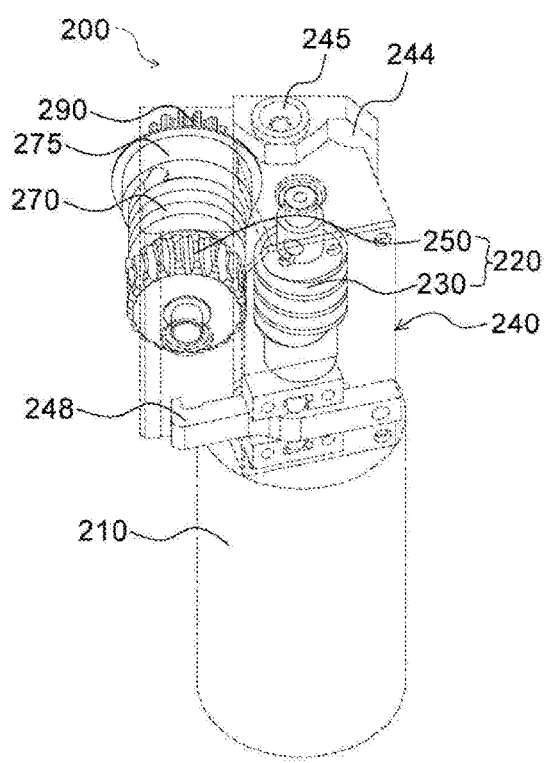

FIG. 5A and FIG. 5B illustrate a joint structure to which a joint actuator is applied, according to an embodiment of the present invention. FIG. 6A and FIG. 6B illustrate engagement and disengagement of a first gear part of the joint actuator, respectively, according to an embodiment of the present invention.

The joint actuator 200 according to an embodiment of the present invention may be mounted on a housing 300 of a joint structure including a joint to be driven. The motor 210 of the joint actuator 200 and the worm gear 230 of the first gear part 220 mounted on the axis of rotation of the motor 210 are hinge-coupled to the housing 300. The worm gear 230 and the worm wheel gear 250 of the first gear part 220 may be selectively disengaged from each other.

The joint actuator 200 may be attached and fixed on one side surface of the housing 300.

In this case, the worm wheel gear case 260 is attached to protrude from one side surface of the housing 300, and thus, the worm wheel gear 250 may be located on a protruding portion of the housing 300. Here, the spring member 270 coupled to the worm wheel gear 250 located on the protruding portion of the housing 300 and the spur gear 290 of the second gear part 290 coupled to the spring member 270 may be provided toward the inside of the housing 300 from the worm wheel gear 250 located outside the one surface of the housing 300 the housing 300.

Here, the spur gear 290 of the second gear part 290 may be provided at an inner side of the housing 300, and coupled to a joint which is to be driven so as to receive a rotational driving force from the joint actuator 200 and transfer to the joint.

The motor 210 and the worm gear 230 of the first gear part 220 mounted on the axis of rotation of the motor 210 may be hinge-coupled to an outer surface of the housing 300. In this case, the worm gear 230 may be included in the worm gear cover 240, and the worm gear cover 240 may protrude from one surface of the housing 300.

Here, the worm gear cover 240 may be hinge-coupled to the housing 300 via the hinge bracket 244 and the pin 245 described above. The worm wheel gear 250 of the first gear 220 provided on an outer side surface of the housing 300 and the worm wheel gear cover 260 including the worm wheel gear 250 therein may be closely adhered to each other on the same plane.

Accordingly, the worm gear cover 240 and the worm wheel gear cover 260 are closely adhered to each other and thus the worm gear 230 included in the worm gear cover 240 and the worm wheel gear 250 included in the worm wheel gear cover 260 may be engaged with each other.

The worm gear cover 240 is hinge-coupled to the housing 300 via the hinge bracket 244 and the pin 245 and may be thus rotated about a part of the housing 300 to which the worm gear cover 240 is hinge-coupled. In this case, the worm gear cover 240 may be rotated toward or away from the worm wheel gear cover 260.

That is, the joint actuator 200 may be mounted on the housing 300 of a joint structure including a joint to be driven. The motor 210 and the worm gear 230 of the first gear part 220 mounted on the axis of rotation of the motor 210 may be hinge-coupled to the housing 300 to be rotated about a part of the housing 300 to which they are hinge-coupled, such that they are rotated toward the worm wheel gear 250 of the first gear part 220 to be engaged with the worm wheel gear 250 or are rotated to be away from the worm wheel gear 250 to be disengaged from the worm wheel gear 250.

Thus, the motor 210 and the worm gear 230 of the first gear part 220 mounted on the axis of rotation of the motor 210 may be rotated about the part of the housing 300 toward the worm wheel gear 250 of the first gear part 220 to be engaged with the worm wheel gear 250 or may be rotated away from the worm wheel gear 250 to be disengaged from the worm wheel gear 250.

Referring to FIGS. 5(a) and 6(a), the worm gear 230 and the worm wheel gear 250 are engaged with each other in a state in which the worm gear 230 is rotated toward the worm wheel gear 250 to be engaged with the worm wheel gear 250. Referring to FIGS. 5(b) and 6(b), the worm gear 230 is disengaged from the worm wheel gear 250 in a state in which the worm gear 230 is rotated away from the worm wheel gear 250.

As described above, in the joint actuator 200 according to an embodiment of the present invention, an engaged state of the first gear part 220 may be selectively determined. Thus, when a rotational driving force generated by the motor 210 is not needed or when battery power should be saved, the engaged state of the first gear part 220 may be selectively canceled. Accordingly, use of the motor 210 may be selectively controlled to reduce power consumption.

That is, disengaging the worm gear 230 and the worm wheel gear 250 from each other should be understood to mean completely blocking a driving power transfer path. Thus, mechanical friction that a user may feel may be more basically removed using a method of removing a degree of torsional deflection of the spring member 270 than a method of controlling mechanical friction by removing a degree of torsional deflection of the spring member 270.

During use of the joint actuator 200, a rotational driving force from which a degree of mechanical friction is reduced may be flexibly output through the spring member 270. Furthermore, when the rotational driving force generated by the motor 210 is not needed or when a random interaction with the outside is needed, the engaged state of the first gear part 220 may be canceled and thus the joint actuator 200 may be more flexibly used.

A joint structure of a leg-supporting robot including a joint actuator will be described below. A joint actuator 200 which will be described below is substantially the same as the joint actuator 200 described above and may not be described in detail below. Furthermore, when components other than the joint actuator 200 are described below, they are substantially the same as those described above and may thus not be described again here if they need not be additionally described.

A joint structure of a leg-supporting robot including the joint actuator 200 which will be described below may be also understood by referring to the drawings used to describe the joint actuator 200 and the other components described above. Thus, the example of wearing a leg-supporting robot using a joint actuator illustrated in each of FIGS. 1A and 1B may be also understood as an example in which a joint structure of a leg-supporting robot including a joint actuator according to the present invention is applied.

Figure 7:
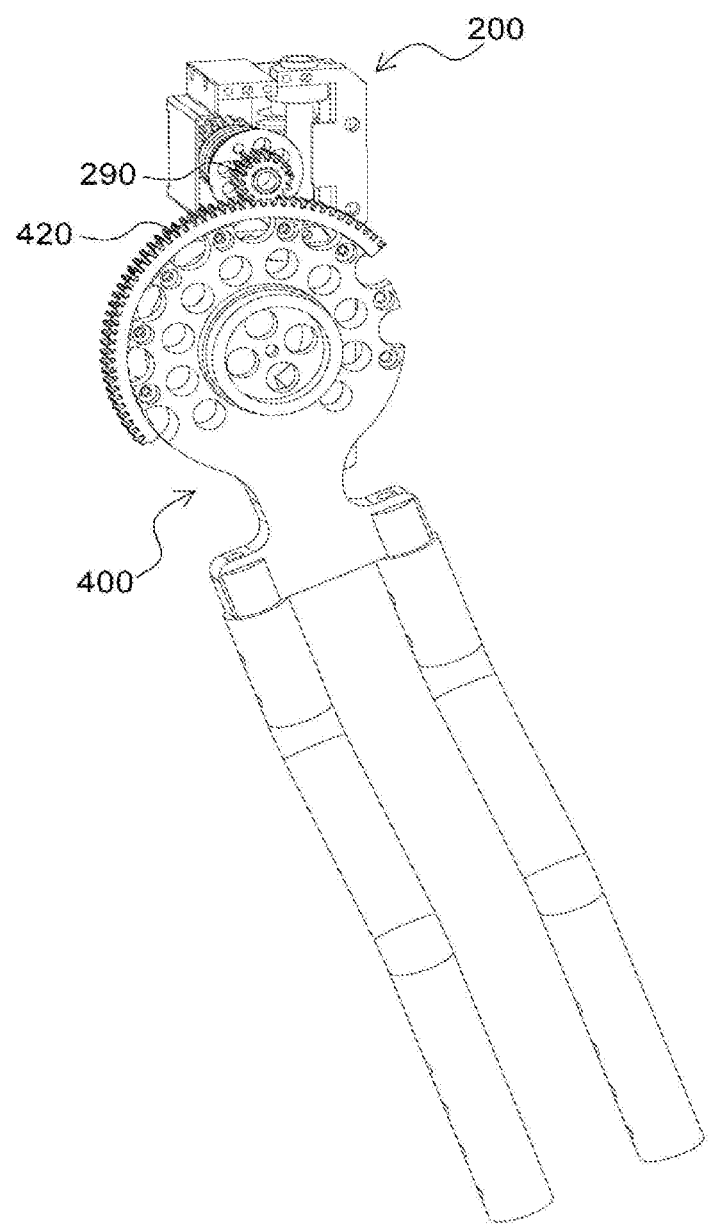
FIG. 7 illustrates a joint actuator and a joint unit coupled to the joint actuator, according to an embodiment of the present invention.
Figure 8:
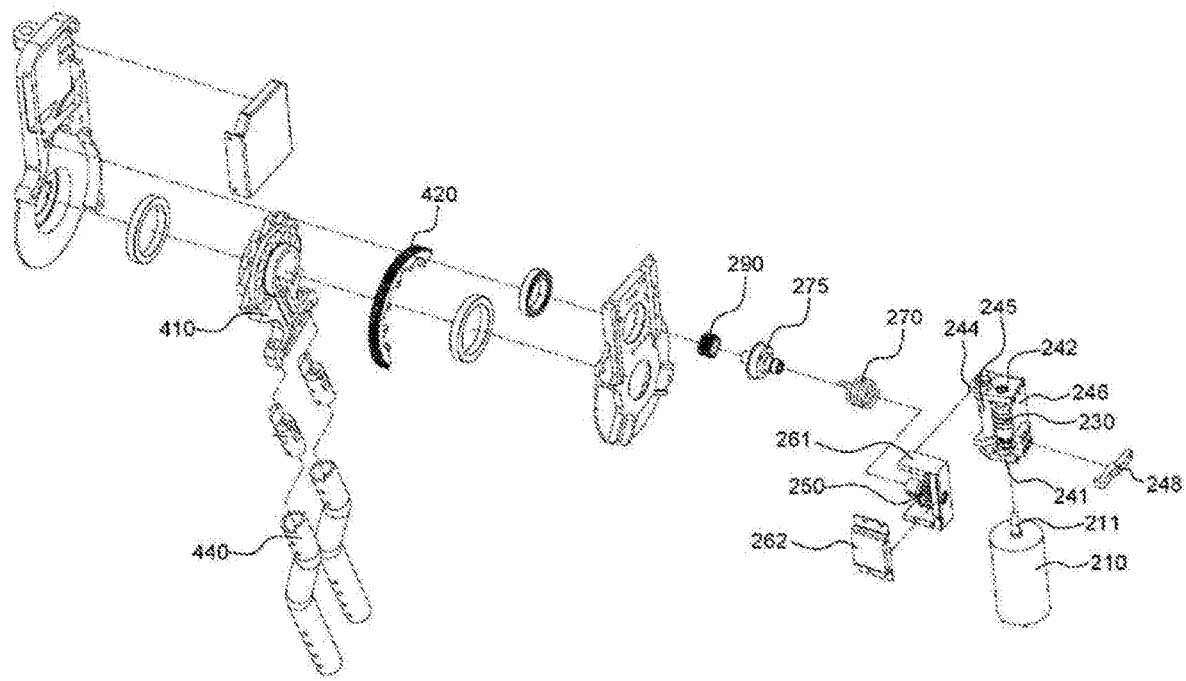
FIG. 8 is an exploded perspective view of a joint structure of a leg-supporting robot including a joint actuator, according to an embodiment of the present invention joint actuator.

FIG. 7 illustrates a joint actuator and a joint unit coupled to the joint actuator, according to an embodiment of the present invention. FIG. 8 is an exploded perspective view of a joint structure of a leg-supporting robot including a joint actuator, according to an embodiment of the present invention.

Referring to FIGS. 7 and 8 and FIGS. 1 to 6, a joint structure of a leg-supporting robot 1000 including a joint actuator according to an embodiment of the present invention may include a joint unit 400 which is hinge-coupled to the joint actuator 200 and the housing 300 and which is rotated by a rotational driving force provided by the second gear part 290.

The joint unit 400 corresponding to a joint part of the leg-supporting robot 1000 includes a sprocket gear or hub 410 having a plurality of sawteeth and may be thus engaged with the spur gear 290 of the second gear part 290 through the sprocket gear or hub 410 having the plurality of sawteeth The sprocket gear or hub 410 having the plurality of sawteeth of the joint unit 400 may be provided in the form of an additional semicircular gear as illustrated in FIG. 7, and may be coupled to a part of the joint unit 400 coupled to the spur gear 290 to be engaged with the spur gear 290. Furthermore, a plurality of protruding grooves may be formed in a part of the joint unit 400 coupled to the spur gear 290 to be combined with the spur gear 290.

Furthermore, the joint unit 400 and the spur gear 290 of the second gear part 290 may be directly engaged with each other through the sprocket gear or hub 410 having the plurality of sawteeth as illustrated in FIG. 7 but may be coupled to each other via at least one auxiliary gear (not shown) between the joint unit 400 and the spur gear 290.

That is, at least one auxiliary gear 420 may be provided between the sprocket gear or hub 410 having the plurality of sawteeth of the joint unit 400 and the spur gear 290 such that it is engaged with the sprocket gear or hub 410 having the plurality of sawteeth of the joint unit 400 and the spur gear 290 or is coupled to the sprocket gear or hub 410 and the spur gear 290 in a line on the same drive shaft line to connect the sprocket gear or hub 410 having the plurality of sawteeth of the joint unit 400 and the spur gear 290.

Here, the joint unit 400 may be rotated by receiving a rotational driving force from the second gear 290 in a state in which the worm gear 230 and the worm wheel gear 250 of the first gear part 220 are engaged with each other, and may not be rotated since the transfer of the rotational driving force from the second gear 290 is blocked when the worm gear 230 and the worm wheel gear 250 of the first gear part 220 are disengaged from each other.

As described above, the worm gear 230 may be closely adhered to or be withdrawn from the worm wheel gear cover 260 when the worm gear cover 240 including the worm gear 230 therein is rotated while being hinge-coupled to a side surface of the housing, thereby engaging the worm gear 230 with or disengaging it from the worm wheel gear 250 of the first gear part 220.

In a transfer path of a rotational driving force generated by the motor 210 in the joint actuator 200 applied to a joint structure of a leg-supporting robot including the joint actuator 200, when the worm gear 230 and the worm wheel gear 250 of the first gear part 220 are rotated away from each other to be disengaged from each other, a rotational driving force transferred from the motor 210 to the worm gear 230 is not transferred to the worm wheel gear 250. Thus, since the rotational driving force is not transferred to the spur gear 290 of the second gear part 290 corresponding to an output side of the joint actuator 200, the joint unit 400 coupled to the spur gear 290 cannot receive the rotational driving force.

Thus, in a joint structure of a leg-supporting robot including the joint actuator 200 according to an embodiment of the present invention, while a user of the leg-supporting robot 1000 is walking or standing erect or in other situations, the user may disengage the worm gear 230 and the worm wheel gear 250 of the first gear part 220 from each other in a situation in which a rotational driving force provided from the joint actuator 200 is not needed, e.g., when the user is sitting on a chair or the ground to take a rest or when the joint unit 400 corresponding to the joint part of the leg-supporting robot 1000 is to be bent to a large degree. Accordingly, the user of the leg-supporting robot 1000 may be able to more freely move.

Here, for selective engagement of the first gear part 220 by the user of the leg-supporting robot 1000, the worm gear cover 240 may include a latch 248 configured to be elastically coupled to the worm wheel gear cover 260.

Thus, the worm gear 230 and the worm wheel gear 250 of the first gear part 220 may be engaged with each other when the latch 248 is coupled to the worm wheel gear cover 260 by the user, and be disengaged from each other when the coupling of the latch 248 to the worm wheel gear cover 260 is canceled.

That is, when the user mounts the latch 248 on the worm wheel gear cover 260, the worm gear cover 240 having the latch 248 mounted thereon may be closely adhered to the worm wheel gear cover 260. Thus, the worm gear 230 included in the worm gear cover 240 and the worm wheel gear 250 included in the worm wheel gear cover 260 may be engaged with each other. When the latch 248 is disengaged from the worm wheel gear cover 260, the worm gear cover 240 having the latch 248 mounted thereon may be moved to be away from the worm wheel gear cover 260 and thus the worm gear 230 included in the worm gear cover 240 may be in a state to be disengaged from the worm wheel gear 250 included in the worm wheel gear cover 260.

Figure 9A:
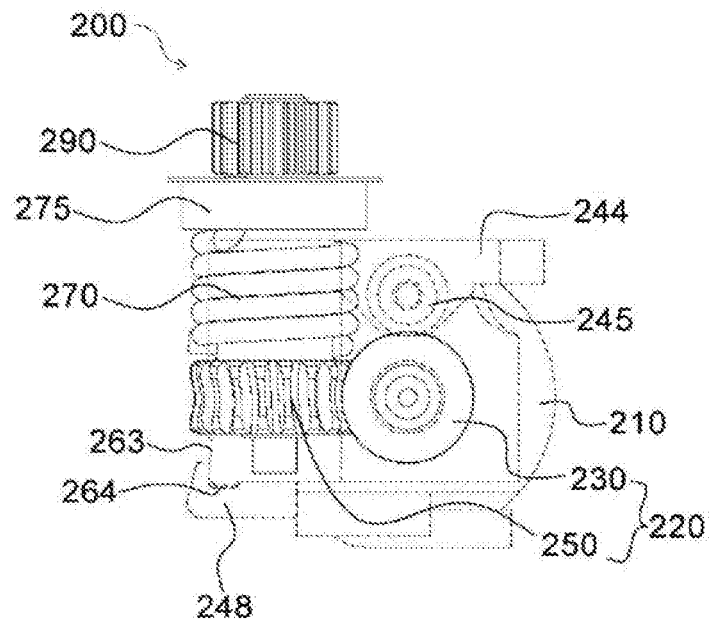
FIG. 9A and FIG. 9B illustrate engagement and disengagement of a first gear part of a joint actuator, respectively, according to another embodiment of the present invention.
Figure 9B:
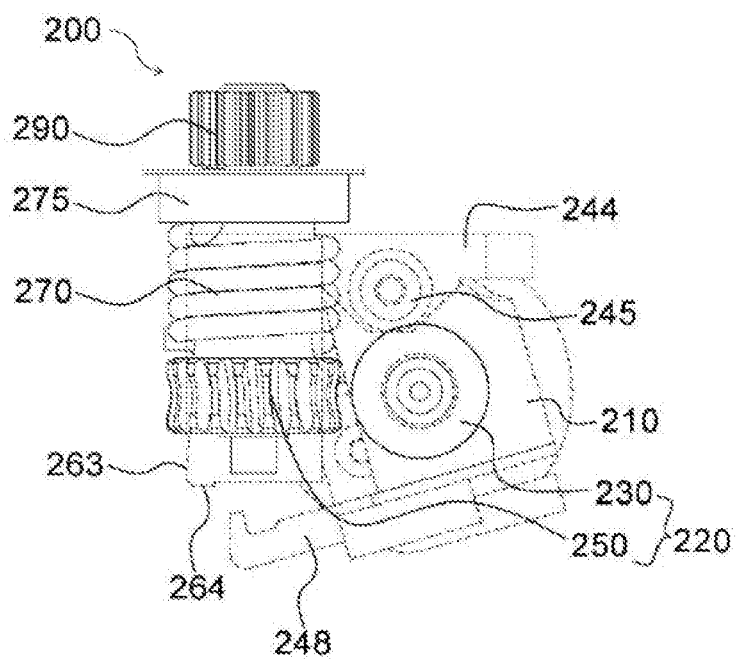
Figure 10:
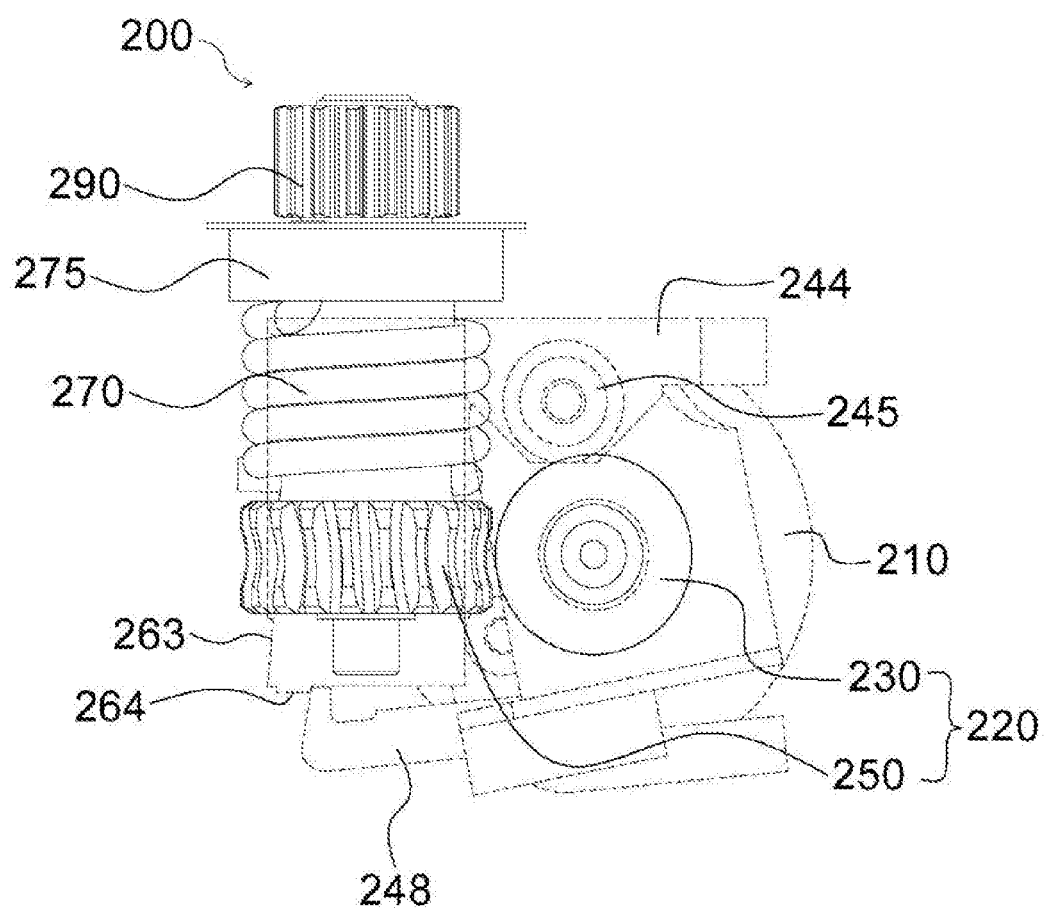
FIG. 10 illustrates a joint actuator in which engagement of a first gear part is canceled, according to an embodiment of the present invention.

FIG. 9A and FIG. 9B illustrate engagement and disengagement of a first gear part of a joint actuator, respectively, according to another embodiment of the present invention. FIG. 10 illustrates a joint actuator in which engagement of a first gear part is canceled, according to an embodiment of the present invention.

A first gear part of a joint actuator according to the present invention includes a worm gear cover configured to place a worm gear at an inner side, and a worm wheel gear cover configured to place the worm wheel gear at an inner side thereof. The worm gear cover may include a latch configured to be selectively coupled to the worm wheel gear cover so as to maintain engagement of the worm gear and the worm wheel gear, and be elastically supported to maintain the engagement of the worm gear and the worm wheel gear.

When the worm gear 230 and the worm wheel gear 250 are unintentionally engaged with each other or disengaged from each other, a user of the leg-supporting robot 1000 would be in a danger or feel discomfort.

Thus, the latch 248 should be engaged with or disengaged from the worm wheel gear cover 260 so that whether the worm gear 230 and the worm wheel gear 250 are to be engaged with each other may be determined only according to a selection of the user of the leg-supporting robot 1000.

To this end, the worm wheel gear cover may include an anti-releasing part 263 which is in the form of a plane inclined in a direction preventing an engaged state of the latch 248 from being canceled to prevent the latch 248 coupled to the worm wheel gear cover 260 from being automatically disengaged from the worm wheel gear cover 260. The worm wheel gear cover may further include an engagement prevention part 264 which is in the form of a protrusion preventing the latch 248 disengaged from the worm wheel gear cover 260 from being automatically engaged with the worm wheel gear cover 260.

The anti-releasing part 263 may be provided in a form inclined or protruding in a direction preventing an engaged state from being canceled at a part of the worm wheel gear cover 260 with which an end of the latch 248 is engaged. FIGS. 9A and 9B illustrate an example in which the anti-releasing part 263 is in the inclined form.

Thus, when the latch 248 is mounted on the worm wheel gear cover 260 as intended by a user, the latch 248 is fixed by being stopped by the anti-releasing part 263 and is thus prevented from being automatically disengaged unintentionally.

The engagement prevention part 264 may be provided in the form of an inclined plane or a protrusion before a position at which it is engaged with the worm wheel gear cover 260 in a path along which an end of the latch 248 is moved to be engaged with the worm wheel gear cover 260. Thus, when the latch 248 is disengaged from the worm wheel gear cover 260, the latch 248 may be stopped by the engagement prevention part 264 not to be automatically engaged with the worm wheel gear cover 260. FIG. 9A and FIG. 9B illustrate an example in which the engagement prevention part 264 is in the form of a protrusion.

The latch 248 described above is configured such that a user of the leg-supporting robot 1000 may be able to selectively determine an engaged state of the first gear part 220 and an engaged or disengaged state of the first gear part 220 may be maintained to secure the user's safety and facilitate the manipulation of the joint actuator 200.

However, even if the engaged state of the first gear part 220 is canceled, the motor 210 which supplies a rotational driving force to the joint actuator 200 may be continuously operated.

Thus, the worm wheel gear cover 260 may include a sensor switch, which is configured to sense attachment or detachment of the latch 248, on a position at which the latch 248 is engaged with the worm wheel gear cover 260.

FIGS. 11A-11D illustrate an operation of a sensor switch according to an embodiment of the present invention.

A sensor switch 265 may sense engagement of a latch 248 and operate a motor 210 when the latch 248 is engaged with the worm wheel gear cover 260, and sense disengagement of the latch 248 from the worm wheel gear cover 260 and stop the operation of the motor 210 when the latch 248 is disengaged from the worm wheel gear cover 260. Here, the sensor switch 265 may be any type of sensor capable of sensing whether the latch 248 is engaged with the worm wheel gear cover 260, e.g., an infrared sensor, a proximity sensor, or a capacitive type sensor.

During use of the leg-supporting robot 1000, the sensor switch 265 may control an operation of the motor 210 according to whether a rotational driving force is needed or not, thereby preventing power loss.

Here, the sensor switch 265 may be turned on when the latch 248 is engaged with the worm wheel gear cover 260 and be turned off when the latch 248 is disengaged from the worm wheel gear cover 260. Thus, a user of the leg-supporting robot 1000 may easily check a driven state of the leg-supporting robot 1000.

Owing to the above structure, in a joint actuator and a joint structure of a leg-supporting robot including the joint actuator according to the present invention, an elastic body is provided between a plurality of gears of the joint actuator to transfer driving power from a motor to a joint part via the elastic body. Thus, when compared to an existing power transfer method using engagement of gears, mechanical friction may be artificially controlled to be reduced or adjusted and the joint actuator and the joint structure may be precisely driven according to any movement of a user who wears the leg-supporting robot or an interaction with an external environment, thereby guaranteeing the user's flexible movement.

Furthermore, in the joint actuator according to the present invention and the joint structure of the leg-supporting robot including the joint actuator, different types of elastic bodies having different degrees of hardness may be selectively used and thus the joint actuator providing different turn forces may be more flexibly applied according to a type of a device used or a user's state. With use of the joint actuator designed in which gears may be selectively engaged with each other, a degree of freedom of the user's movement may be more increased and thus the user may be able of more flexibly using the leg-supporting robot.

While the technical idea of the present invention has been described with respect to examples thereof, various changes and modifications may be made in the present invention without departing from essential features of the present invention by those of ordinary skill in the technical field to which the present invention pertains. Thus, the embodiments of the present invention set forth herein are not intended to restrict the technical idea of the present invention and are only used to describe it. The scope of the present invention is not limited by these embodiments. Therefore, the scope of the invention should be defined by the appended claims, and all differences within the scope will be construed as being included in the present invention.

The invention claimed is:

1. A joint structure of a leg-supporting robot, the joint structure comprising:
   a joint actuator mounted on a housing of the joint structure, the joint actuator including:
      a motor;
      a first gear part configured to change a direction of a rotational driving force applied by the motor and increase the applied rotational driving force;
      a spring member, a degree of a torsional deflection of which is determined by a rotational driving force supplied by the first gear part; and
      a second gear part configured to receive a rotational driving force according to the degree of the torsional deflection from the spring member; and
   a joint unit configured to be hinge-coupled to the housing of the joint structure and rotatably driven by a rotational driving force applied by the second gear part of the joint actuator,
   wherein the first gear part includes:
      a worm gear mounted on an axis of a rotation of the motor;
      a worm wheel gear configured to be engaged with the worm gear, the worm wheel gear having a drive shaft perpendicular to the axis of the rotation of the motor;
      a worm wheel gear cover configured to place the worm wheel gear at an inner side of the worm wheel gear cover; and
      a worm gear cover configured to place the worm gear at an inner side of the worm wheel gear cover, the worm gear cover including a latch configured to be selectively coupled to the worm wheel gear cover so as to maintain engagement of the worm gear and the worm wheel gear,
   wherein the motor and the worm gear of the first gear part are hinge-coupled to the housing to be rotated about a part of the housing to which the motor and the worm gear are hinge-coupled, such that the motor and the worm gear are rotated toward the worm wheel gear of the first gear part to be engaged with the worm wheel gear or are rotated to be away from the worm wheel gear to be disengaged from the worm wheel gear,
   wherein the rotational driving force applied by the second gear part is transferred to the joint unit to rotatably drive the joint unit in a state in which the worm gear and the worm wheel gear of the first gear part are engaged with each other, and
   wherein a transfer of the rotational driving force from the second gear part is blocked when the worm gear and the worm wheel gear of the first gear part are disengaged from each other.

2. The joint structure of the leg-supporting robot of claim 1, wherein the joint unit comprises a hub,
   wherein the hub is rotatably driven by the rotational driving force from the second gear part.

3. The joint structure of the leg-supporting robot of claim 2, wherein the hub of the joint unit is coupled to the second gear part via at least one auxiliary gear.

4. The joint structure of the leg-supporting robot of claim 1, wherein the worm wheel gear cover comprises an anti-releasing part comprising a plane inclined in a direction preventing an engaged state of the latch coupled to the worm wheel gear cover from being disengaged.

5. The joint structure of the leg-supporting robot of claim 1, wherein the worm wheel gear cover comprises an engagement prevention part comprising a protrusion preventing the latch disengaged from the worm wheel gear cover from being engaged with the worm wheel gear cover.

6. A joint structure of a leg-supporting robot, the joint structure comprising:
   a joint actuator mounted on a housing of the joint structure, the joint actuator including:
      a motor;
      a first gear part configured to change a direction of a rotational driving force applied by the motor and increase the applied rotational driving force;
      a spring member, a degree of a torsional deflection of which is determined by a rotational driving force supplied by the first gear part; and
      a second gear part configured to receive a rotational driving force according to the degree of the torsional deflection from the spring member; and a joint unit configured to be hinge-coupled to the housing of the joint structure and rotatably driven by a rotational driving force applied by the second gear part of the joint actuator, wherein the first gear part includes:
  a worm gear mounted on an axis of a rotation of the motor;
  a worm wheel gear configured to be engaged with the worm gear, the worm wheel gear having a drive shaft perpendicular to the axis of the rotation of the motor;
  a worm wheel gear cover configured to place the worm wheel gear at an inner side of the worm wheel gear cover; and
  a worm gear cover configured to place the worm gear at an inner side of the worm gear cover, the worm gear cover including a latch configured to be selectively coupled to the worm wheel gear cover so as to maintain engagement of the worm gear and the worm wheel gear, wherein the second gear part comprises at least one spur gear, wherein a drive shaft of the spur gear of the second gear part is aligned with the drive shaft of the worm wheel gear of the first gear part, the spring member is torsionally deflected by a rotational driving force applied by the worm wheel gear of the first gear part, and a rotational driving force which is proportional to the degree of the torsional deflection of the spring member is transferred to the spur gear of the second gear part, wherein the motor and the worm gear of the first gear part are hinge-coupled to the housing to be rotated about a part of the housing to which the motor and the worm gear are hinge-coupled, such that the motor and the worm gear are rotated toward the worm wheel gear of the first gear part to be engaged with the worm wheel gear or are rotated to be away from the worm wheel gear to be disengaged from the worm wheel gear, wherein the rotational driving force applied by the second gear part is transferred to the joint unit to rotatably drive the joint unit in a state in which the worm gear and the worm wheel gear of the first gear part are engaged with each other, and wherein a transfer of the rotational driving force from the second gear part is blocked when the worm gear and the worm wheel gear of the first gear part are disengaged from each other.

7. The joint structure of the leg-supporting robot of claim 6, wherein the joint unit comprises a hub,
  wherein the hub is rotatably driven by the rotational driving force from the second gear part.

8. The joint structure of the leg-supporting robot of claim 7, wherein the hub of the joint unit is coupled to the second gear part via at least one auxiliary gear.

9. The joint structure of the leg-supporting robot of claim 6, wherein the worm wheel gear cover comprises an anti-releasing part comprising a plane inclined in a direction preventing an engaged state of the latch coupled to the worm wheel gear cover from being disengaged.

10. The joint structure of the leg-supporting robot of claim 6, wherein the worm wheel gear cover comprises an engagement prevention part comprising a protrusion preventing the latch disengaged from the worm wheel gear cover from being engaged with the worm wheel gear cover.

11. A joint structure of a leg-supporting robot, the joint structure comprising:
  a joint actuator mounted on a housing of the joint structure, the joint actuator including:
    a motor;
    a first gear part configured to change a direction of a rotational driving force applied by the motor and increase the applied rotational driving force;
    a spring member, a degree of a torsional deflection of which is determined by a rotational driving force supplied by the first gear part; and
    a second gear part configured to receive a rotational driving force according to the degree of the torsional deflection from the spring member; and
  a joint unit configured to be hinge-coupled to the housing of the joint structure and rotatably driven by a rotational driving force applied by the second gear part of the joint actuator, wherein the first gear part includes:
  a worm gear mounted on an axis of a rotation of the motor;
  a worm wheel gear configured to be engaged with the worm gear, the worm wheel gear having a drive shaft perpendicular to the axis of the rotation of the motor;
  a worm wheel gear cover configured to place the worm wheel gear at an inner side of the worm wheel gear cover; and
  a worm gear cover configured to place the worm gear at an inner side of the worm gear cover, the worm gear cover including a latch configured to be selectively coupled to the worm wheel gear cover so as to maintain engagement of the worm gear and the worm wheel gear, wherein the motor and the worm gear of the first gear part are hinge-coupled to the housing to be rotated about a part of the housing to which the motor and the worm gear are hinge-coupled, such that the motor and the worm gear are rotated toward the worm wheel gear of the first gear part to be engaged with the worm wheel gear or are rotated to be away from the worm wheel gear to be disengaged from the worm wheel gear, wherein the worm gear and the worm wheel gear are engaged with each other when the worm gear is rotated toward the worm wheel gear and are disengaged from each other when the worm gear is rotated to be away from the worm wheel gear, wherein the rotational driving force applied by the second gear part is transferred to the joint unit to rotatably drive the joint unit in a state in which the worm gear and the worm wheel gear of the first gear part are engaged with each other, and wherein a transfer of the rotational driving force from the second gear part is blocked when the worm gear and the worm wheel gear of the first gear part are disengaged from each other.

12. The joint structure of the leg-supporting robot of claim 11, wherein the joint unit comprises a hub, wherein the hub is rotatably driven by the rotational driving force from the second gear part.

13. The joint structure of the leg-supporting robot of claim 12, wherein the hub of the joint unit is coupled to the second gear part via at least one auxiliary gear.

14. The joint structure of the leg-supporting robot of claim 11, wherein the worm wheel gear cover comprises an anti-releasing part comprising a plane inclined in a direction preventing an engaged state of the latch coupled to the worm wheel gear cover from being disengaged.

15. The joint structure of the leg-supporting robot of claim 11, wherein the worm wheel gear cover comprises an engagement prevention part which comprising a protrusion preventing the latch disengaged from the worm wheel gear cover from being engaged with the worm wheel gear cover.

* * * * *